United States Patent
Govil et al.

(10) Patent No.: US 7,385,750 B2
(45) Date of Patent: Jun. 10, 2008

(54) SPATIAL LIGHT MODULATOR USING AN INTEGRATED CIRCUIT ACTUATOR

(75) Inventors: Pradeep K Govil, Norwalk, CT (US); James G Tsacoyeanes, Southury, CT (US)

(73) Assignee: ASML Holding N.V., Veldhoven (NL)

( * ) Notice: Subject to any disclaimer, the term of this patent is extended or adjusted under 35 U.S.C. 154(b) by 0 days.

(21) Appl. No.: 10/651,048

(22) Filed: Aug. 29, 2003

(65) Prior Publication Data

US 2005/0046921 A1   Mar. 3, 2005

(51) Int. Cl.
*G02B 26/00* (2006.01)
*G02B 26/08* (2006.01)

(52) U.S. Cl. .................. 359/291; 359/295; 359/224; 359/290

(58) Field of Classification Search .............. 359/290, 359/291, 295, 571, 223, 224, 320, 322, 323; 385/18
See application file for complete search history.

(56) References Cited

U.S. PATENT DOCUMENTS

| | | | |
|---|---|---|---|
| 5,493,623 A * | 2/1996 | Frische et al. | 385/12 |
| 5,735,026 A | 4/1998 | Min | |
| 5,862,002 A | 1/1999 | Ji | |
| 6,002,154 A * | 12/1999 | Fujita | 257/349 |
| 6,059,416 A | 5/2000 | Choi | |
| 6,232,936 B1 | 5/2001 | Gove et al. | |
| 6,249,370 B1 * | 6/2001 | Takeuchi et al. | 359/291 |
| 6,549,694 B2 * | 4/2003 | Makino et al. | 385/18 |
| 6,639,722 B2 * | 10/2003 | Amm et al. | 359/571 |
| 6,856,449 B2 * | 2/2005 | Winkler et al. | 359/298 |
| 2002/0006248 A1 | 1/2002 | Makino et al. | |
| 2003/0035189 A1 | 2/2003 | Amm et al. | |

FOREIGN PATENT DOCUMENTS

| | | |
|---|---|---|
| EP | 1355 184 | 10/2003 |
| JP | 63-294140 A | 11/1988 |
| JP | 7-174993 A | 7/1995 |
| JP | 7-181403 A | 7/1995 |
| JP | 8-036141 A | 2/1996 |
| JP | 8-149355 A | 6/1996 |
| JP | 11-142753 | 5/1999 |
| JP | 2002-189173 A | 7/2002 |
| JP | 2002-350749 A | 12/2002 |

OTHER PUBLICATIONS

A. A. Mills and R. Clift, "Reflections on the 'Burning Mirrors of Archimedes'" Jun. 25, 1992, Euro J. Phys., vol. 13, No. 6.

(Continued)

*Primary Examiner*—Ricky Mack
*Assistant Examiner*—Jack Dinh
(74) *Attorney, Agent, or Firm*—Sterne, Kessler, Goldstein & Fox P.L.L.C.

(57) ABSTRACT

A spatial light modulator (SLM) includes an integrated circuit actuator that can be fabricated using photolithography or other similar techniques. The actuator includes actuator elements, which can be made from piezoelectric materials. An electrode array is coupled to opposite walls of each of the actuator elements is an electrode array. Each array of electrodes can have one or more electrode sections. The array of reflective devices forms the SLM.

13 Claims, 5 Drawing Sheets

OTHER PUBLICATIONS

Search Report from European Patent Application No. 04019841.8, dated Nov. 24, 2004, 3 pages.
Machine translation from JPO website of JP 07-287176, published Oct. 31, 1995.
Machine translation from JPO website of JP 11-142753, published May 28, 1999.
Search Report from Singapore Patent Application No. 200404822-9, 7 pages, dated Mar. 30, 2005.
Office Action , dated Mar. 8, 2007, for JP Patent Application No. 2004-245786, 3 pgs.
Examination Report for Singapore Patent Application No. 200404822-9 mailed on Sep. 26, 2007, 9 pgs.
Written Opinion for Singapore Patent Application No. 200404822-9 mailed Oct. 23, 2006, 9 pgs.
Translation of Office Action and Office Action for Japanese Patent Application No. 2004-245786 mailed Jul. 3, 2007, 7 pgs.

* cited by examiner

SPATIAL LIGHT MODULATOR USING AN INTEGRATED CIRCUIT ACTUATOR

BACKGROUND OF THE INVENTION

1. Field of the Invention

The present invention is related to spatial light modulators, and more particularly, to reflective spatial light modulators.

2. Background Art

A spatial light modulator (SLM) (e.g., a digital micro mirror device (DMD), a liquid crystal display (LCD), or the like) typically includes an array of active areas (e.g., mirrors or transmissive areas) that are controlled to be either ON or OFF to form a desired pattern. A predetermined and previously stored algorithm based on a desired exposure pattern is used to turn ON and OFF the active areas.

Conventional reflective SLMs use mirrors (e.g., reflective elements, pixels, etc.) as the active areas. The mirrors are controlled using electrical circuits that cause resilient devices (e.g., leverage arms) to tilt or move the mirrors. For example, electrostatic tilting mirrors can be used. The tiling or moving cause light transmitted towards the mirrors to be reflected towards or away from a target. SLMs have included increasingly smaller mirrors in recent years to comply with the increasing resolution required of them. However, further decrease in the size of the mirrors is limited based on the current manufacturing technology and materials used. For example, current mirrors can be as small as about 16 microns in width or diameter. Example environments using an SLM can be photolithography, maskless photolithography, biotechnology, projection televisions, and the like.

Lithography is a process used to create features on the surface of substrates. Such substrates can include those used in the manufacture of flat panel displays (e.g., liquid crystal displays), circuit boards, various integrated circuits, and the like. A frequently used substrate for such applications is a semiconductor wafer or glass substrate. While this description is written in terms of a semiconductor wafer or a flat panel display, for illustrative purposes, one skilled in the art would recognize that this description also applies to other types of substrates known to those skilled in the art.

During lithography, a wafer, which is disposed on a wafer stage, is exposed to an image projected onto the surface of the wafer by exposure optics located within a lithography apparatus. While exposure optics are used in the case of photolithography, a different type of exposure apparatus can be used depending on the particular application. For example, x-ray, ion, electron, or photon lithography each can require a different exposure apparatus, as is known to those skilled in the art. The particular example of photolithography is discussed here for illustrative purposes only.

The projected image produces changes in the characteristics of a layer, for example photoresist, deposited on the surface of the wafer. These changes correspond to the features projected onto the wafer during exposure. Subsequent to exposure, the layer can be etched to produce a patterned layer. The pattern corresponds to those features projected onto the wafer during exposure. This patterned layer is then used to remove or further process exposed portions of underlying structural layers within the wafer, such as conductive, semiconductive, or insulative layers. This process is then repeated, together with other steps, until the desired features have been formed on the surface, or in various layers, of the wafer.

Step-and-scan technology works in conjunction with a projection optics system that has a narrow imaging slot. Rather than expose the entire wafer at one time, individual fields are scanned onto the wafer one at a time. This is accomplished by moving the wafer and reticle simultaneously such that the imaging slot is moved across the field during the scan. The wafer stage must then be asynchronously stepped between field exposures to allow multiple copies of the reticle pattern to be exposed over the wafer surface. In this manner, the quality of the image projected onto the wafer is maximized.

Conventional lithographic systems and methods form images on a semiconductor wafer. The system typically has a lithographic chamber that is designed to contain an apparatus that performs the process of image formation on the semiconductor wafer. The chamber can be designed to have different gas mixtures and/or grades of vacuum depending on the wavelength of light being used. A reticle is positioned inside the chamber. A beam of light is passed from an illumination source (located outside the system) through an optical system, an image outline on the reticle, and a second optical system before interacting with a semiconductor wafer.

A plurality of reticles is required to fabricate a device on the substrate. These reticles are becoming increasingly costly and time consuming to manufacture due to the feature sizes and the exacting tolerances required for small feature sizes. Also, a reticle can only be used for a certain period of time before being worn out. Further costs are routinely incurred if a reticle is not within a certain tolerance or when the reticle is damaged. Thus, the manufacture of wafers using reticles is becoming increasingly, and possibly prohibitively, expensive.

In order to overcome these drawbacks, maskless (e.g., direct write, digital, etc.) lithography systems have been developed. The maskless system replaces a reticle with a SLM. However, as feature sizes become smaller, conventional SLMs may no longer provide the required resolution needed.

Therefore, what is needed is a system and method providing an SLM that can be used for very high resolution environments.

BRIEF SUMMARY OF THE INVENTION

Embodiments of the present invention provide an integrated circuit micro-optoelectro-mechanical system (MOEMS) spatial light modulator including an array of reflective devices, an integrated circuit actuator having an array of actuator elements, first and second arrays of electrodes coupled to opposite walls of each of the actuator elements. Electrical energy can cause the actuator material (e.g., piezoelectric material) to expand or contract, which moves the reflecting devices in a corresponding direction.

A still further embodiment of the present invention provides a method including the following steps. Transmitting light towards a MOEMS integrated circuit spatial light modulator having an array of mirrors. Moving the mirrors using integrated circuit actuators via electrodes coupled thereto. Forming a wavefront based on the light interacting with the mirrors.

Further embodiments, features, and advantages of the present inventions, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 6:
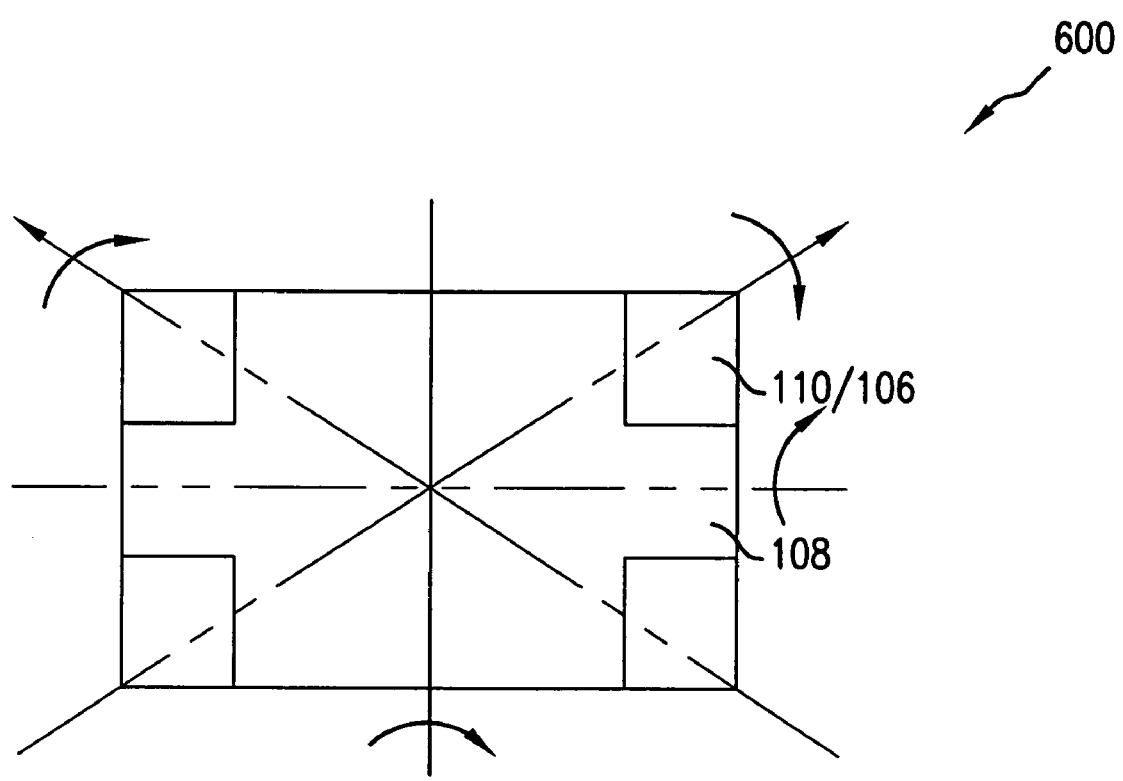
Figure 7:
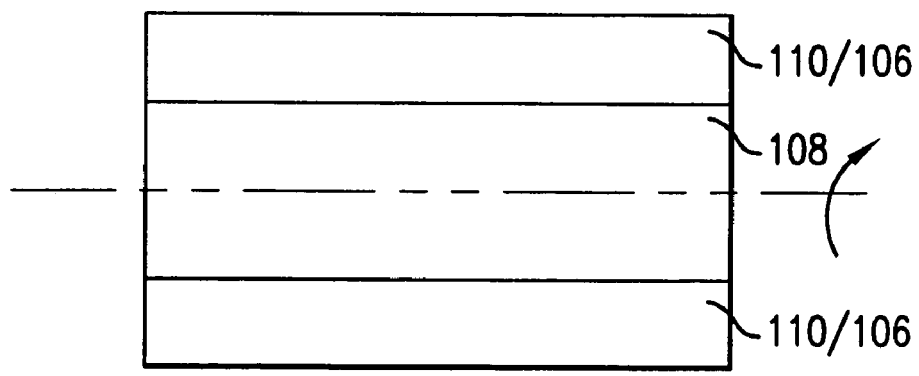
Figure 8:
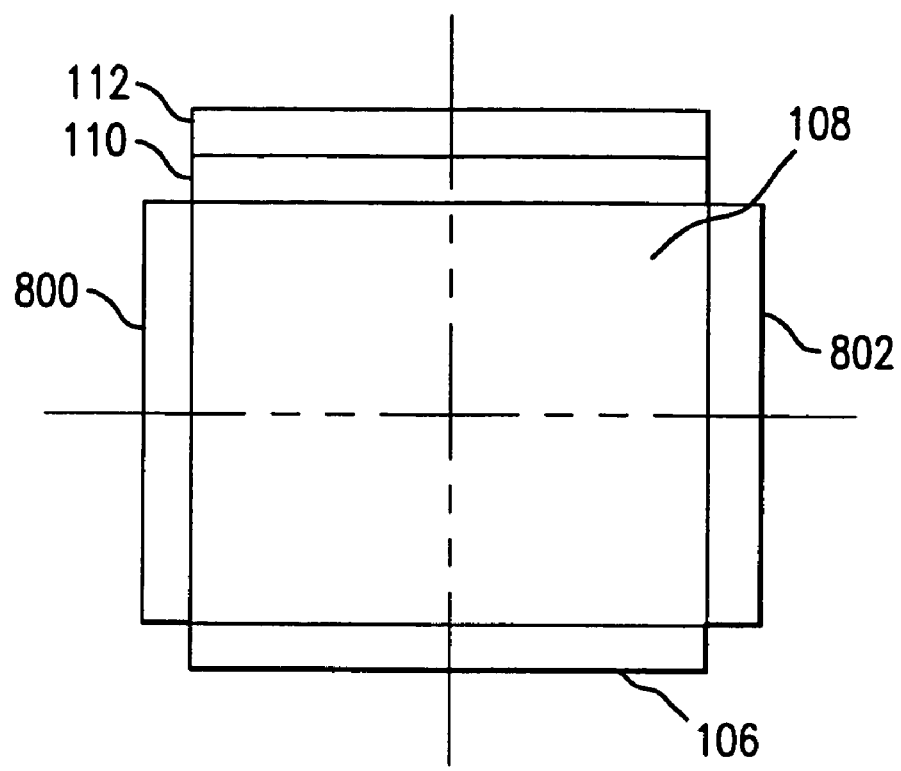

FIGS. 6, 7, and 8 show various electrode patterns according to various embodiments of the present invention.

Figure 9:
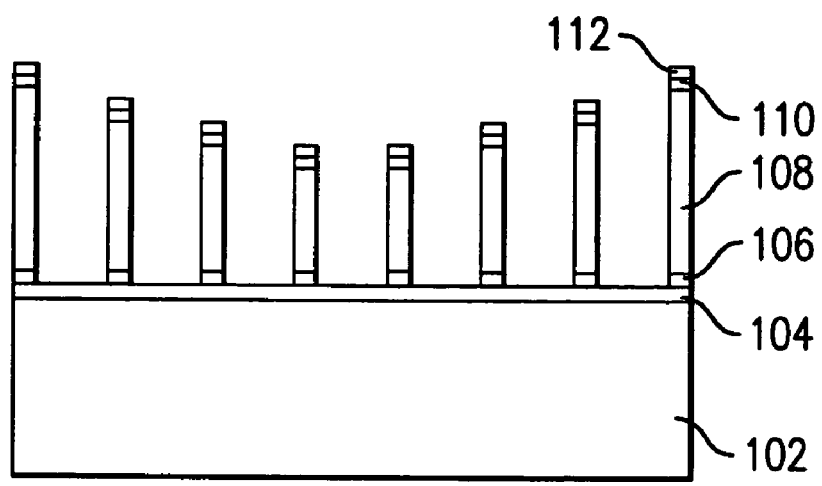

FIG. 9 shows a portion of an SLM according to embodiments of the present invention.

The present invention will now be described with reference to the accompanying drawings. In the drawings, like reference numbers may indicate identical or functionally similar elements. Additionally, the left-most digit(s) of a reference number may identify the drawing in which the reference number first appears.

DETAILED DESCRIPTION OF THE INVENTION

Overview

While specific configurations and arrangements are discussed, it should be understood that this is done for illustrative purposes only. A person skilled in the pertinent art will recognize that other configurations and arrangements can be used without departing from the spirit and scope of the present invention. It will be apparent to a person skilled in the pertinent art that this invention can also be employed in a variety of other applications.

Embodiments of the present invention provide a MOEMS or MEMS SLM that includes an integrated circuit actuator that can be fabricated using photolithography or other similar techniques. The actuator includes actuator elements, which can be made from piezoelectric materials. First and second electrode arrays are coupled to opposite walls of the actuator elements to provide power thereto. Each array of electrodes can have one or more electrode sections. The array of reflective devices forms the mirror of the SLM and are moved via the actuator elements based on the electrical energy being provided to the electrodes.

In one example environment, the SLM can be used in place of a reticle in maskless photolithography to project patterns onto a substrate. In another example, the SLM can be used in a projection optical system of a photolithographic tool, if the SLM is aspherical in shape, to correct for aberrations in a wavefront. In yet another example, the SLM can be used in biomedical and other biotechnology environments, as is known in the relative arts. In yet still another embodiment, the SLM can be used in projection televisions. In other examples, using the fine resolution accomplished through the integrated circuit actuators, the SLM can fix a sigma during pupil fill and can be part of a dynamically adjustable slit application to correct illumination uniformity. The are all exemplary environments, and are not meant to be limiting.

Two-Directional Movement Actuators

Figure 1:
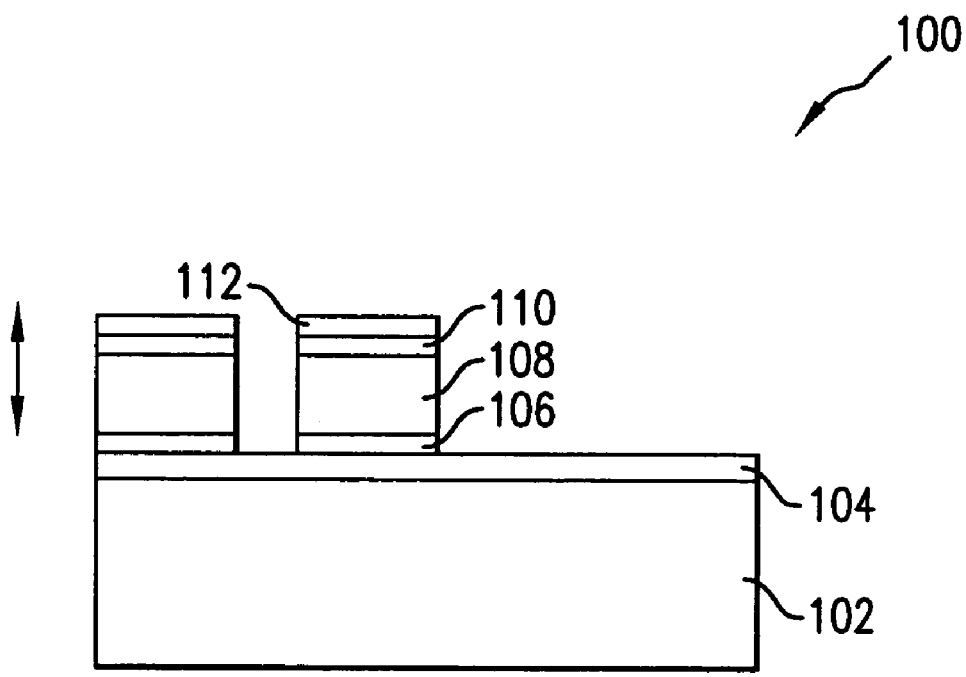
FIG. 1 shows a portion of an SLM according to embodiments of the present invention.

FIG. 1 shows a portion of an SLM 100 according to embodiments of the present invention. In various embodiments, SLM 100 can be an integrated circuit micro-opto-electro-mechanical system (MOEMS) SLM or micro-electro-mechanical system (MEMS) SLM. SLM 100 includes a substrate 102 having an optional thermally insulating layer 104. An array of electrodes 106 can be coupled to insulating layer 104 or substrate 102. Actuator elements 108 are coupled between electrodes 106 and another array of electrodes 110. Reflective devices 112 are coupled to the array of electrodes 110. In this configuration, actuator elements 108 can move reflective devices 112 in two directions (e.g., up and down) when being energized via electrode 106. This can be referred to as a piston-like motion. In one embodiment, the distance of movement can be $+/-\frac{1}{4}\lambda$, where $\lambda$ is a wavelength of impinging light (not shown). In other embodiments, the distance may be smaller, such as $\frac{1}{8}$ or $\frac{1}{16}\lambda$, or any other.

Although not specifically shown, electrodes 106 can be coupled to conductive devices (e.g., wires) coupling electrodes 106 to a controller or a power supply. The wire can either pass through substrate 102 or be directly coupled to electrodes 106. Layout and fabrication of such wire interconnects are well known in the manufacturer manufacturing art.

Each actuator element 108 can be made using piezoelectric materials. For example, lead zirconate titanate (PZT), zinc oxide (ZnO), polyvinylidene fluoride (PVDF) polymer films, or the like can be used (hereinafter, the term piezoelectric and all materials that can make up the same will be referred to as "PZT").

The integrated circuit actuator elements 108 work in a linear fashion, which provides phase shift and creates interference patterns to provide finer resolution. Also, manufacture of the integrated circuit actuator elements 108 is simpler compared to conventional actuators because integrated circuit actuators do not require electrostatic and complex lithography techniques during formation.

Depending on a height (e.g., thickness) of each actuator element 108 and/or spacing between actuator elements 108, each actuator element 108 can be decoupled or coupled to each other actuator element 108, for example as discussed below with reference to FIGS. 2-3. This can be based on a desired use of SLM 100.

FIG. 9 shows a portion of an SLM 900 according to embodiments of the present invention. In this embodiment, actuator elements 108 can have varying heights in order to form an overall curved, convex, spherical, aspherical, etc. shaped SLM 900. It is to be appreciated that a concave shape can also be formed. Also, actuators elements 108 can be placed in various locations on substrate 102. Varying one or both of height and/or position of the array of actuator elements 108 can allow for various diffraction patterns to be formed by reflective devices 112.

With reference again to FIG. 1, and continuing reference to FIG. 9, reflective devices 112 can be configured to form various shapes, e.g. rectangular, circular, quasar shaped, aspheric, etc. Reflective devices 112 can be made from silicon, gallium arsinide, gallium nitride, glass, or the like. Integrated circuit actuator configurations and/or sizes can be tailored to provide the desired response at the mirror and can be use during a high frequency operation (e.g., 50-100 kHz).

Figure 2:
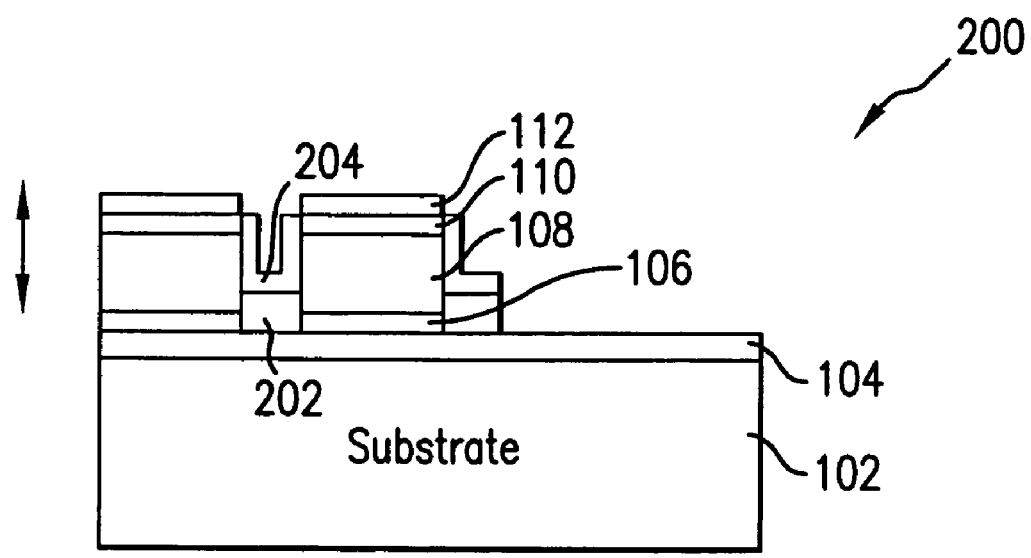
FIG. 2 shows a portion of an SLM according to embodiments of the present invention.

FIG. 2 shows a portion of an SLM 200 according to embodiments of the present invention. SLM 200 is similar in operation and make-up to SLM 100, except that it includes a piezoelectric structure 202 between actuator elements 108 and electrodes 106 and a conductive structure 204 between actuator elements 108 and electrodes 110. These structures 202 and 204 can allow adjacent actuator elements 108 to be coupled (e.g., controlled) together, allowing control of a group of reflective elements 112 at a time. It is to be appreciated that specific shapes and/or sizes of structures 202 and 204 can vary based on implementation specific design requirements.

In other embodiments (not shown), the bottom electrode layer can be a single electrode across the bottom or rows of electrodes, rather than individual electrodes 106. This can be used to minimize the number of electrical connections. Insulator layer 104, or portions thereof, can be omitted. A single control line would be coupled to electrode array 110 and not the single electrode.

Four-Directional Movement Actuators

Figure 3:
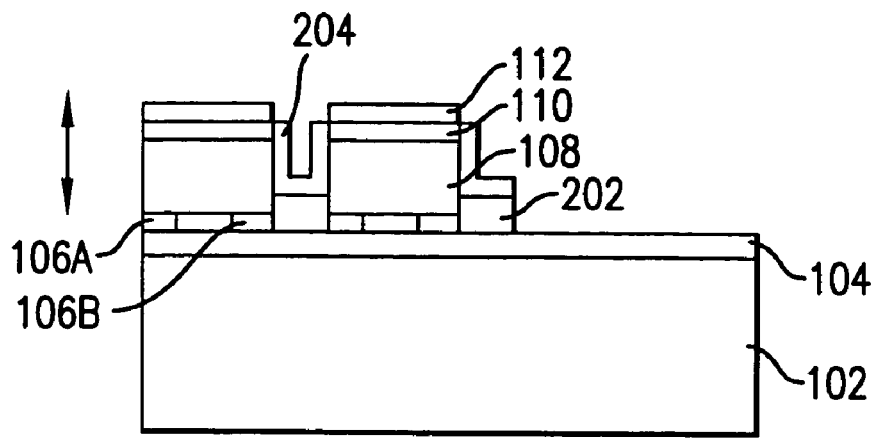
FIG. 3 shows a portion of an SLM according to embodiments of the present invention.

FIG. 3 shows a portion of an SLM 300 according to embodiments of the present invention. SLM 300 is similar to SLMs 100 and 200, except that each electrode 106 includes two sections 106A and 106B, which are independently controlled. Actuator elements 108 can move reflective devices 112 in four directions (e.g., up, down, tilt left, tilt right) based on using the two electrode sections 106A and 106B. Only energizing one electrode section 106A or 106B at a time accomplishes this. For example, energizing electrode section 106A will cause actuator element 108 to tilt down left or up right (in the perspective shown), which in turn causes reflective device 112 to move in the same direction. The opposite is true when energizing electrode 106B.

It is to be appreciated that closed loop position control can be used to control SLMs 100, 200, or 300. Each actuator element 108 can be used to measure capacitance, since each PZT is basically an insulator. Measuring the capacitance change can predict how much actuator element 108, and in turn reflective element 112, has moved. This can be used to confirm the movement taking place.

Also, since PZT devices have hysteresis. If SLM 100, 200, or 300 follows a predetermined algorithm and repeats it, each actuator element 108, and in turn each reflective device 112, can have repeatable positions. Using a proper algorithm can reset the PZT material every time it is moved, so that positions can repeat quite accurately.

Method for Making an SLM with an Integrated Circuit Actuator

The following is one example process 400 that can be used to form SLM 100 or 900. It is to be appreciated many other processes used to form integrated circuits that are now know or developed in the future are also contemplated within the scope of the present invention.

Figure 4:
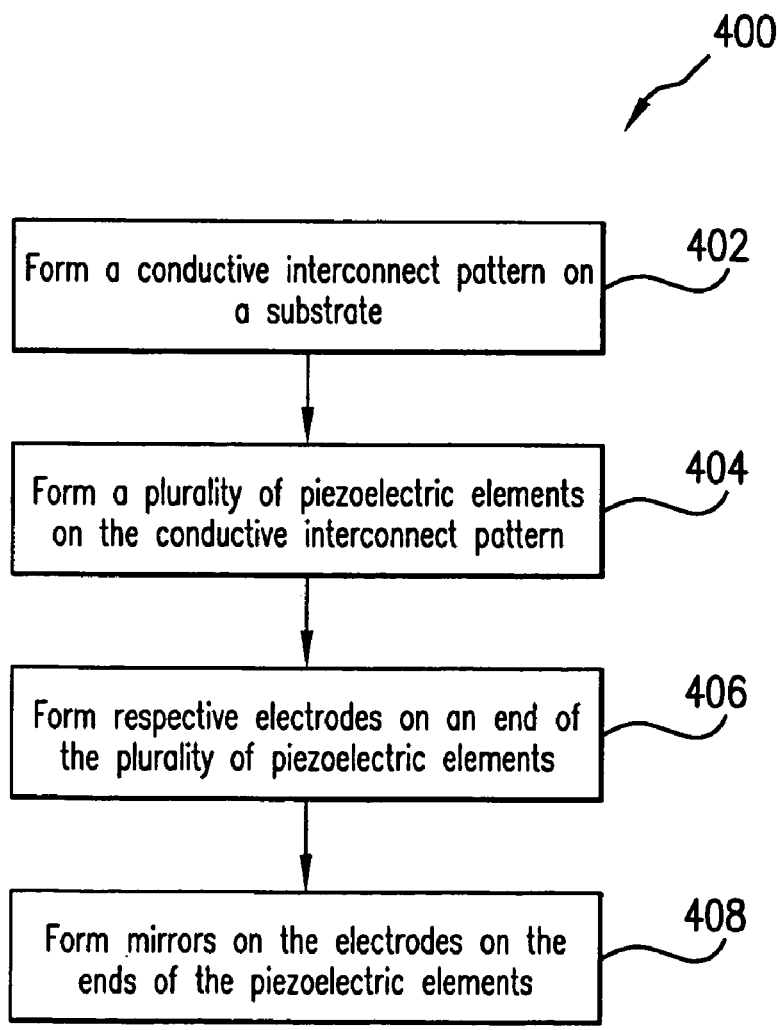
FIG. 4 shows a flowchart depicting a method for making an SLM according to embodiments of the present invention.

FIG. 4 shows a flowchart depicting a method 400 according to an embodiments of the present invention. In step 402, a conductive interconnect pattern is formed on a substrate. In step 404, a plurality of piezoelectric elements are formed on the conductive interconnect pattern. In step 406, respective electrodes are formed on an end of the plurality of piezoelectric elements. In step 408, mirrors are formed on the electrodes on the ends of the piezoelectric elements.

Figure 5:
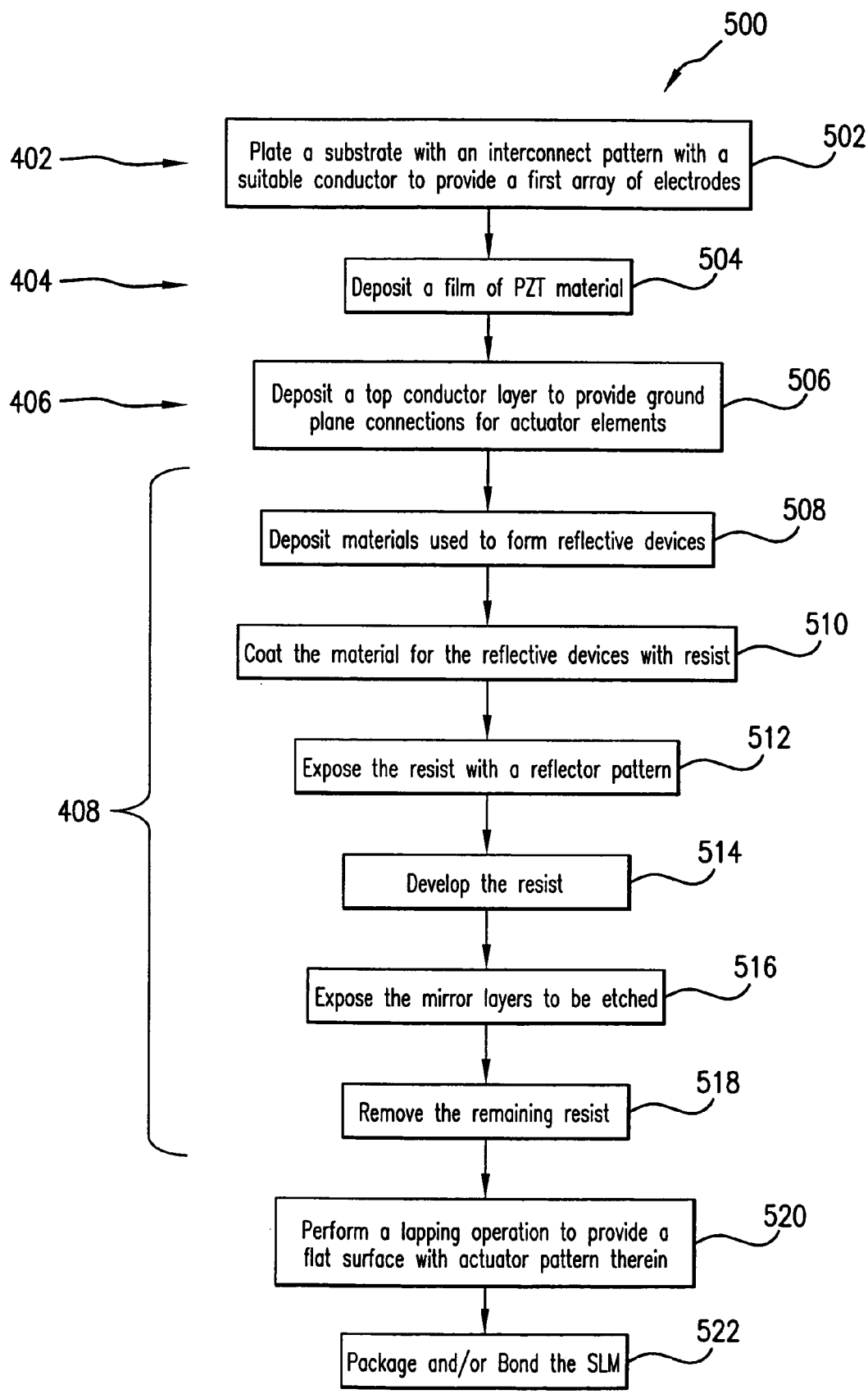
FIG. 5 shows a flowchart showing details of steps performed in FIG. 4 according to one embodiment of the present invention.

FIG. 5 shows a flowchart showing details of steps performed in method 400 according to an embodiment of the present invention (steps 502-522).

In step 502, which is related to step 402, substrate 102 (e.g., silicon, sapphire, and silicon on sapphire, etc.) is plated with an interconnect pattern using a suitable conductor (e.g., nickel, etc.) to provide electrodes 106 (e.g., individual ohmic connections to the PZT layer 108 to be formed later).

In step 504, which is related to step 404, a film of PZT material 108 can be formed using deposition, sputtering, evaporation, plating, or any other know or future developed process. A layer several microns thick may be needed depending upon a specific application of SLM 100.

In step 506, which is related to step 406, a top conductor layer 110 can be formed to provide ground plane connections for PZT actuator 108.

Steps 508 to 518 are related to step 408.

In step 508, materials used to form reflective devices 112 can be applied. In step 510, the material for the reflective devices 112 can be coated, for example, with resist that is subsequently exposed in step 512 with a reflector pattern. In step 514, the resist can be developed. In step 516, the mirror layer areas can be exposed to be etched. Reflector size can be selected to have a single PZT actuator 108 per reflector 112.

In one embodiment, an anisotropic etching technique can be used to etch through unmasked areas of the reflective device/PZT layer. This will form mirror/actuator arrays, while substantially reducing actuator underetching. Examples of such techniques can include chemically assisted plasma etching techniques, sputter techniques, ion milling, etc. In another embodiment, laser ablation can be used to separate reflective device/PZT elements.

In step 518, the remaining resist can be removed.

Steps 520-522 are optional steps not specifically shown in FIG. 4.

In step 520, a lapping operation can be performed to provide a flat surface with an actuator pattern thereon.

In step 522, SLM 100 can be packaged and/or bonded.

It is to be appreciated that actuator elements 108 can be formed using other equivalent process steps and/or other orders of process steps, as would be known to one of ordinary skill in the relevant arts.

In one embodiment, actuator elements and the associated reflective devices can have diameters or widths of as small as about 1 micron, which is magnitudes smaller than the conventional actuators that can typically only be as small as about 16 microns. This is accomplished through using the integrated circuit manufacturing techniques (e.g., photolithographic techniques) described above. It is to be appreciated that even smaller diameters or widths are possible for the actuator elements and/or mirrors as integrated circuit technology advances. Thus, a very high resolution SLM can be manufactured that is able to be used in very small wavelength environments (e.g., EUV). It is to be appreciated that the ranges for mirror size and density may change in the future as technology advances, and are not meant to be limiting, only exemplary.

Electrode Patterns

FIGS. 6-8 show various electrode patterns according to various embodiments of the present invention. Depending on an application of SLM 100 and/or a coordinate system used to control SLM 100, various electrode patterns can be used. The electrode pattern used will dictate the number of degrees of freedom for SLM 100. It is to be appreciated that the electrode patterns shown in these figures and discussed above are merely exemplary, and not meant to be exhaustive. Other electrode patterns can be used, and are contemplated within the scope of the present invention. For example, an number and any placement of electrodes can be used to provide any desired location of an axis of rotation or axes of rotation. This is all a result of using integrated circuit actuators.

FIG. 6 is a top view of a pattern 600 of either first electrode array 106 or second electrode array 110 on actuator elements 108. Pattern 600 allows SLM 100 to rotate or pivot about four axes.

FIG. 7 is a top view of a pattern 700 of either first electrode array 106 or second electrode array 110 on actuator elements 108. Pattern 700 allows SLM 100 to rotate or pivot about one axis.

FIG. 8 is a side-view of a section of SLM 100 according to embodiments of the present invention. In this configuration, in addition to first and second electrode arrays 106 and 110, a third electrode array 800 and a fourth electrode array 802 are coupled/deposited to actuator elements 108. This can allow for X, Y, and Z motion for the actuator elements 108 and respective reflective devices 112. Therefore, mirrors 112 can "shift" or be displaced side to side (in the perspective of the figure) when electrodes 800/802 are energized. It is to be appreciated that only one pair of electrodes, 106/110 or 800/802, can be coupled to opposite walls of the actuator elements 108.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A spatial light modulator configured to receive an incident wavefront, comprising:
   a continuous solid and substantially rigid substrate having a surface; and
   a plurality of individual actuators formed on the surface of the substrate and separated laterally from one another thereby forming a two dimensional array, each of the individual actuators having a mirror formed on an actuator element section, the actuator element section including an actuator element that is sandwiched by a pair of electrodes,
   wherein for each of the individual actuators, the mirror is formed so that when the electrode pair is energized the individual actuator moves the mirror with respect to the surface of the substrate, such that the incident wavefront is received by the mirrors normal to the substrate and is modulated across the two dimensional array of mirrors to produce an output wavefront having at least one of a phase shift or an interference pattern in the output wavefront.

2. The spatial light modulator of claim 1, wherein the individual actuators are configured to move the mirrors in two or four directions to modulate the incident wavefront.

3. The spatial light modulator of claim 1, wherein one electrode in each of the pairs of electrodes is formed between the individual actuator and the substrate and includes a plurality of spaced apart electrode portions.

4. The spatial light modulator of claim 3, wherein the plurality of spaced apart electrode portions are configured to allow the individual actuators to tilt the mirrors to modulate the incident wavefront.

5. The spatial light modulator of claim 1, wherein adjacent ones of the individual actuators have different heights.

6. The spatial light modulator of claim 1, wherein the individual actuators move the mirrors about one-quarter of a wavelength of light in each direction to modulate the incident wavefront.

7. The spatial light modulator of claim 1, wherein the individual actuators are configured such that the mirrors form an overall curved shape.

8. The spatial light modulator of claim 1, wherein the mirrors are positioned in default positions at varying heights with respect to a plane formed by the surface of the substrate, such that varying output wavefront patterns are generated by the incident wavefront reflecting therefrom.

9. The spatial light modulator of claim 1, further comprising:
   a plurality of coupling devices that couple individual actuators;
   wherein, through the plurality of coupling devices, the individual actuators are connected to each other, such that movement of each of the individual actuators is controlled with respect to each other to form an overall desired reflecting configuration of the mirrors to modulate the incident wavefront.

10. The spatial light modulator of claim 1, further comprising:
    an insulating layer coupled to the substrate that dissipates heat generated by the pairs of electrodes.

11. The spatial light modulator of claim 1, wherein the pairs of electrodes are energized to cause a material of the individual actuators to expand and contract to move the mirrors in a plurality of directions relative to a longitudinal axis of each of the individual actuators, wherein the movement causes a reflecting surface of the mirrors to become unparallel to a plane parallel to the surface of the substrate to modulate the incident wavefront.

12. A method of forming a spatial light modulator that receives an incident wavefront and modulates the incident wavefront, comprising:
    forming a plurality of individual actuators including actuation element sections on a surface of a continuous solid and substantially rigid substrate, the plurality of individual actuators being separated laterally from one another thereby forming a two dimensional array;
    forming electrodes at opposite ends of each respective actuator element in each respective one of the actuator element sections; and
    forming a mirror on each of the individual actuator sections;
    wherein for each of the individual actuators, the mirror is formed so that when the electrode pair is energized the individual actuator moves the mirror with respect to the surface of the substrate, such that the incident wavefront is received by the mirrors normal to the substrate and is modulated across the two dimensional array of mirrors to produce an output wavefront having at least one of a phase shift or an interference pattern in the output wavefront.

13. A method, comprising:
    receiving an incident wavefront on a two dimensional array of mirrors; and
    moving respective ones of the mirrors through energizing of electrode pairs formed at opposite ends of corresponding actuator elements in corresponding ones of actuator element sections of corresponding ones of a plurality of individual actuators formed on a surface of a continuous solid and substantially rigid substrate and separated laterally from one another, thereby forming a two dimensional array of the individual actuators, each of the actuator element sections is coupled to a corresponding one of the mirrors, wherein when selected ones of the electrode pairs are energized respective ones of the individual actuators move respective ones of the mirrors with respect to the surface of the substrate, such that the incident wavefront is received by the mirrors normal to the substrate and is modulated across the two dimensional array of mirrors to produce an output wavefront having at least one of a phase shift or an interference pattern in the output wavefront.

* * * * *